(12) United States Patent
Sakamoto et al.

(10) Patent No.: US 9,397,995 B2
(45) Date of Patent: Jul. 19, 2016

(54) INFORMATION PROCESSING APPARATUS AND USER AUTHENTICATION METHOD

(71) Applicant: FUJITSU LIMITED, Kawasaki-shi, Kanagawa (JP)

(72) Inventors: Takuya Sakamoto, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 14/509,588

(22) Filed: Oct. 8, 2014

(65) Prior Publication Data

US 2015/0154388 A1     Jun. 4, 2015

(30) Foreign Application Priority Data

Nov. 29, 2013  (JP) .................................. 2013-247150

(51) Int. Cl.
| | |
|---|---|
| G06F 21/00 | (2013.01) |
| H04L 29/06 | (2006.01) |
| G06F 21/45 | (2013.01) |
| G06F 12/00 | (2006.01) |
| G06F 7/04 | (2006.01) |
| G06F 12/14 | (2006.01) |
| G06F 13/00 | (2006.01) |

(52) U.S. Cl.
CPC ............... *H04L 63/08* (2013.01); *G06F 21/45* (2013.01); *H04L 63/168* (2013.01); *G06F 2221/2137* (2013.01)

(58) Field of Classification Search
None
See application file for complete search history.

(56) References Cited

U.S. PATENT DOCUMENTS

| | | | |
|---|---|---|---|
| 6,052,711 A | 4/2000 | Gish | |
| 6,115,040 A | 9/2000 | Bladow et al. | |
| 7,287,011 B1 * | 10/2007 | Wood ................. | G06K 19/0719 705/65 |
| 2002/0128984 A1 | 9/2002 | Mehta | |
| 2006/0075224 A1 * | 4/2006 | Tao ........................ | G06F 21/121 713/164 |
| 2009/0248996 A1 | 10/2009 | Mandyam et al. | |
| 2009/0282345 A1 * | 11/2009 | Smith .................. | G06Q 10/109 715/744 |
| 2009/0300756 A1 * | 12/2009 | Merchant ................ | G06F 21/34 726/20 |
| 2012/0254352 A1 | 10/2012 | Ito | |
| 2013/0088325 A1 * | 4/2013 | Choi ....................... | G06F 21/35 340/5.61 |
| 2013/0091559 A1 * | 4/2013 | Thun ...................... | G06F 21/43 726/9 |
| 2014/0019757 A1 * | 1/2014 | Mehtala .................. | G06F 21/33 713/168 |

(Continued)

FOREIGN PATENT DOCUMENTS

| | | |
|---|---|---|
| JP | 10-254705 | 9/1998 |
| JP | 2003-525475 | 8/2003 |

(Continued)

*Primary Examiner* — Shin-Hon Chen
(74) *Attorney, Agent, or Firm* — Fujitsu Patent Center

(57) ABSTRACT

An information processing apparatus includes a memory and a processor that is connected to the memory. The processor executes a process including: determining, when startup of an application is instructed, whether the application needs user authentication; executing, when it is determined that the user authentication is needed, the user authentication by starting up an authentication application that is different from the application; and executing, when the result of the user authentication indicates that the user authentication is successful, the application that is instructed to start up.

13 Claims, 10 Drawing Sheets

(56) References Cited

U.S. PATENT DOCUMENTS

| | | | | |
|---|---|---|---|---|
| 2014/0032691 A1* | 1/2014 | Barton | .................... | H04L 41/00 709/206 |
| 2014/0082707 A1* | 3/2014 | Egan | ................... | H04L 63/0853 726/5 |
| 2014/0259134 A1* | 9/2014 | Scavo | ................... | H04L 67/141 726/7 |
| 2014/0298421 A1* | 10/2014 | Johnson | ............... | H04L 63/083 726/4 |
| 2014/0331273 A1* | 11/2014 | Koneru | ................... | H04L 63/20 726/1 |
| 2015/0012995 A1* | 1/2015 | Korat | ................... | H04W 12/06 726/8 |
| 2015/0089632 A1* | 3/2015 | Bartholomew | ....... | G06F 21/629 726/17 |
| 2015/0101032 A1* | 4/2015 | Shimakawa | ............ | G06F 21/44 726/8 |
| 2015/0106895 A1* | 4/2015 | Barbir | ..................... | H04L 63/08 726/7 |
| 2015/0242852 A1* | 8/2015 | Goldstone | .............. | G06Q 20/10 705/44 |

FOREIGN PATENT DOCUMENTS

| | | |
|---|---|---|
| JP | 2004-530958 | 10/2004 |
| JP | 2011-523243 | 8/2011 |
| JP | 2012-216162 | 11/2012 |
| WO | 99/15984 | 1/1999 |
| WO | 99/15984 | 4/1999 |
| WO | 02/44892 | 6/2002 |
| WO | 2009/120599 | 1/2009 |
| WO | 2009/120599 | 10/2009 |

* cited by examiner

```
<?xml version="1.0" encoding="UTF-8"?>
<widget
xmlns="http://www.w3.org/ns/widgets">
<icon src="icon.png" />
<content src="index.html" />
<name short="Agenda">Agenda</name>
<feature name="http://example.com/auth"/>
</widget>
```
204
205

```
<?xml version="1.0" encoding="UTF-8"?>
<widget
xmlns="http://www.w3.org/ns/widgets">
<icon src="icon.png" />
<content src="index.html" />
<name short="Agenda">Agenda</name>
<feature name="http://example.com/auth"/>
    <param name="group" value="group1"/>
</feature>
</widget>
```

```
<?xml version="1.0" encoding="UTF-8"?>
<widget
xmlns="http://www.w3.org/ns/widgets">
<icon src="icon.png" />
<content src="index.html" />
<name short="Agenda">Agenda</name>
<feature name="http://example.com/auth"/>
    <param name="gpattern" value="1"/>
</feature>
</widget>
```

FIG.14

| SERVICE | LOGIN NAME | PASSWORD |
|---------|------------|----------|
| SERVICE A | xxx | yyy |
| SERVICE B | aaa | bbb |

INFORMATION PROCESSING APPARATUS AND USER AUTHENTICATION METHOD

CROSS-REFERENCE TO RELATED APPLICATION

This application is based upon and claims the benefit of priority of the prior Japanese Patent Application No. 2013-247150, filed on Nov. 29, 2013, the entire contents of which are incorporated herein by reference.

FIELD

The embodiments discussed herein are directed to an information processing apparatus and a user authentication method.

BACKGROUND

A conventional Web service that implements various services via the Internet is provided on a server and, in general, users use the Web service via a Web browser of a client. However, in recent years, attention has been given to the technology of Packaged Web applications (Packaged Web Apps) that is used by downloading archived files that are created by using languages, such as the Hypertext Markup Language (HTML) 5, JavaScript™, Cascading Style Sheets (CSS), or the like. Specifically, in the World Wide Web Consortium (W3C) that is the standards organization for the technology related to the World Wide Web (WWW), standardization of the Packaged Web applications technology has been developed, for example. Because the Packaged Web applications are downloaded to a client and then used, the Packaged Web applications have a feature in that the applications can be used in an offline state in which the connection between the client and a server is disconnected.

Patent Document 1: Japanese Laid-open Patent Publication No. 2012-216162

Patent Document 2: Japanese National Publication of International Patent Application No. 2011-523243

In order to prevent an unauthorized use of applications, such as the Packaged Web applications, user authentication in which authentication is performed on a user who uses an application is preferably performed. However, there is a problem in that a mechanism of user authentication that is used to prevent an unauthorized use of the Packaged Web applications that are also used in an offline state is not currently present.

A specific example of the user authentication includes, for example, a screen lock function in a smart phone. The screen lock function is a function of requesting an input of a PIN code or a password every time the screen of the smart phone is in an ON state or is a function of executing biometric authentication by using a fingerprint or the like. However, the screen lock function is used to protect the entirety of a terminal device, such as a smart phone or the like, and user authentication is performed every time the terminal device is used. Consequently, introducing the user authentication that is performed by a complicated method into the screen lock function is impractical. In contrast, because some applications, such as the Packaged Web application or the like, are used, for example, for business, the applications are preferably protected by user authentication in which the security can be ensured at a certain level or more. Accordingly, with the user authentication performed by using the screen lock function, protection of the applications is insufficient.

Furthermore, there is a known technology that sets a password to a file in order to protect, for example, the contents that are downloaded. However, in order to execute the user authentication by using the password when an application is started up, in addition to the primary function of the application, the function of the user authentication needs to be included in the application. Consequently, for example, in a case of the Packaged Web application, the same function used for the user authentication needs to be installed in all Web applications, which is inefficient. Furthermore, for example, if a password for authentication is changed, the password needs to be changed for all of the applications, which is inconvenient.

SUMMARY

According to an aspect of an embodiment, an information processing apparatus includes a memory and a processor that is connected to the memory. The processor executes a process including: determining, when startup of an application is instructed, whether the application needs user authentication; executing, when it is determined that the user authentication is needed, the user authentication by starting up an authentication application that is different from the application; and executing, when the result of the user authentication indicates that the user authentication is successful, the application that is instructed to start up.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a schematic diagram illustrating a specific example of an authentication information table.

DESCRIPTION OF EMBODIMENTS

Preferred embodiments of the present invention will be explained with reference to accompanying drawings. The present invention is not limited to these embodiments.

[a] First Embodiment

Figure 1:
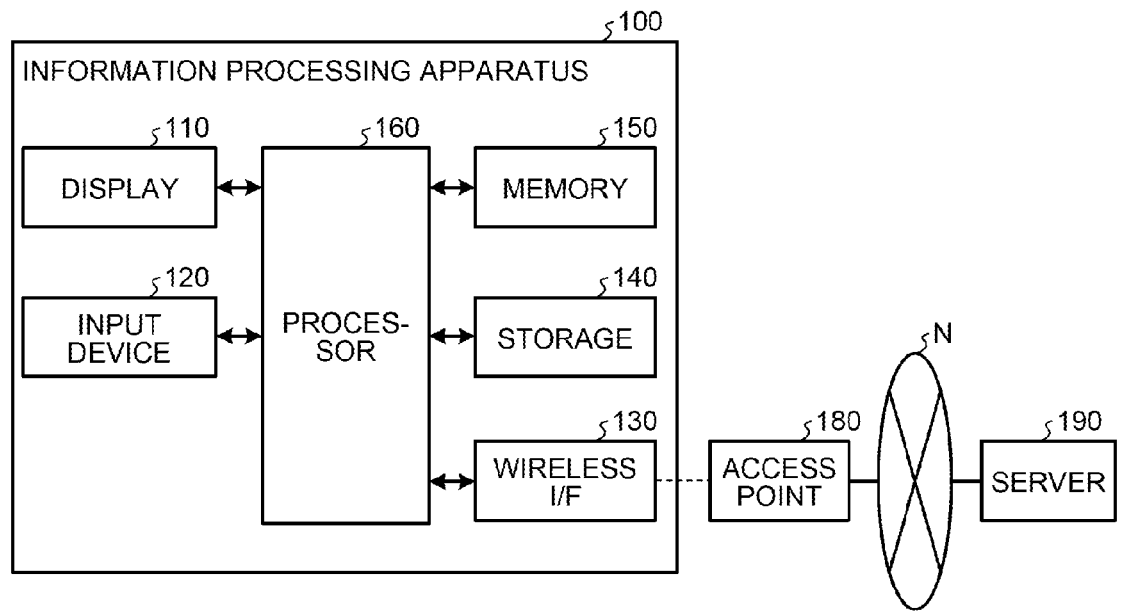
FIG. 1 is a schematic diagram illustrating an example configuration of a communication system according to a first embodiment.

FIG. 1 is a schematic diagram illustrating an example configuration of a communication system according to a first embodiment. In the communication system illustrated in FIG. 1, an information processing apparatus 100 is wirelessly connected to an access point 180 and the access point 180 is connected to a server 190 via a wired network N.

The information processing apparatus 100 downloads the Packaged Web application (hereinafter, simply referred to as a "Web application") from the server 190 via the access point 180 when the information processing apparatus 100 is in an online state in which the information processing apparatus 100 is wirelessly connected to the access point 180. Furthermore, the information processing apparatus 100 executes the downloaded Web application when the information processing apparatus 100 is in an offline state in which the wireless connection to the access point 180 is disconnected. Furthermore, in addition to the offline state, the information processing apparatus 100 may also execute the Web application when the information processing apparatus 100 is in the online state.

When the information processing apparatus 100 starts up the Web application, the information processing apparatus 100 determines whether this Web application is a Web application that needs user authentication. If it is determined that the user authentication is not needed, the information processing apparatus 100 executes the Web application. In contrast, if it is determined that the user authentication is needed, the information processing apparatus 100 executes an application for the user authentication (hereinafter, referred to as an "authentication application") that is previously stored. Then, if the user authentication performed by using the authentication application has been successful, the information processing apparatus 100 executes the Web application, whereas if the user authentication failed, the information processing apparatus 100 stops the execution of the Web application. The functions performed by the information processing apparatus 100 may also be included in, for example, a part of the function performed by a Web browser or may also be included in, for example, a part of the runtime function that is used to execute the Web application.

Specifically, the information processing apparatus 100 includes a display 110, an input device 120, a wireless interface (hereinafter, referred to as a "wireless I/F") 130, storage 140, a memory 150, and a processor 160.

The display 110 is a display unit that includes, for example, a liquid crystal panel and that displays various kinds of information. On the display 110, for example, the list of Web applications installed in the information processing apparatus 100 is displayed.

The input device 120 includes, for example, a touch panel and a key and receives an input performed by a user. The input device 120 receives authentication information, such as a password, that is input by a user when user authentication is performed.

The wireless I/F 130 sends and receives a signal via a wireless line. Namely, the wireless I/F 130 sends a radio signal to the access point 180 and receives a radio signal from the access point 180. Specifically, when a Web application is downloaded from the server 190, the wireless I/F 130 sends a signal for requesting acquisition of the Web application to the access point 180 and receives a signal that includes data on the Web application from the access point 180. Furthermore, the wireless I/F 130 may also receive a signal that includes data on authentication application from the access point 180.

The storage 140 is a storing unit that includes, for example, a flash memory and that stores therein various kinds of information. The storage 140 includes both a system area that is a protected area in which an operating system (OS) or the like is stored and a data area in which applications and general data are stored. Furthermore, for example, the storage 140 stores the authentication application in the system area and stores the Web application in the data area.

The memory 150 includes, for example, a random access memory (RAM) or the like and stores therein active application data by using the processor 160. Namely, for example, if an authentication application is executed, the processor 160 loads the authentication application that is stored in the storage 140 into the memory 150. Similarly, for example, if a Web application is executed, the processor 160 loads the Web application that is stored in the storage 140 into the memory 150.

The processor 160 controls each device included in the information processing apparatus 100 and executes an application by using the memory 150. When the processor 160 starts up the Web application, the processor 160 determines whether this Web application is a Web application that needs user authentication. If it is determined that the user authentication is not needed, the processor 160 executes the Web application. In contrast, if it is determined that a user authentication is needed, the processor 160 executes the authentication application and executes, if the user authentication has been successful, the Web application. However, if the user authentication failed, the processor 160 does not execute the Web application.

Figure 2:
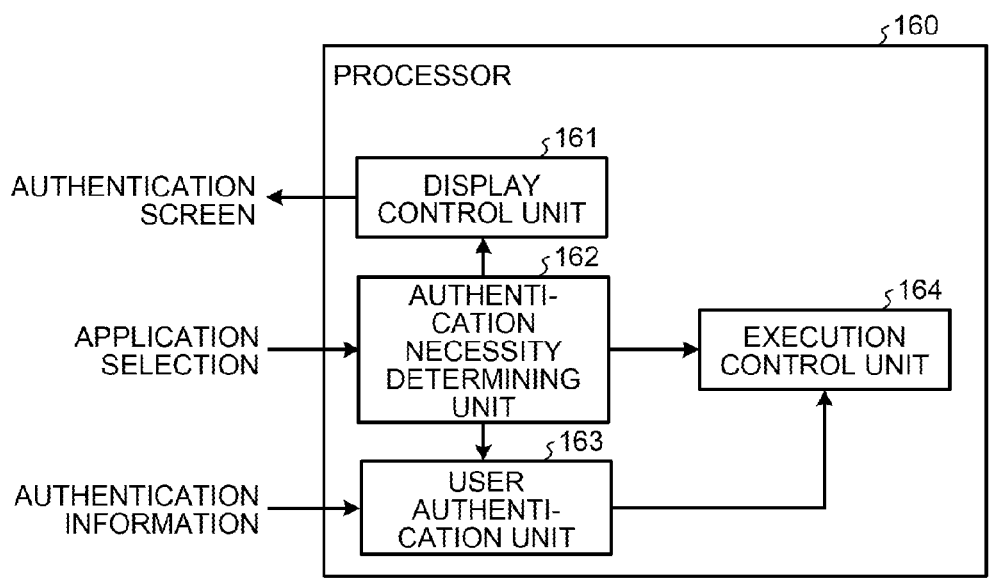
FIG. 2 is a block diagram illustrating the function performed by a processor according to the first embodiment.

In the following, the function performed by the processor 160 will be described with reference to FIG. 2. FIG. 2 is a block diagram illustrating the function performed by the processor 160 according to the first embodiment. As illustrated in FIG. 2, the processor 160 includes a display control unit 161, an authentication necessity determining unit 162, a user authentication unit 163, and an execution control unit 164.

The display control unit 161 controls the displaying performed by the display 110. Namely, when an OS is started up, the display control unit 161 allows the display 110 to display, for example, an application list screen that displays the list of Web applications that can be executed. Then, when an authentication application is executed for user authentication when the Web application is started up, the display control unit 161 allows the display 110 to display an authentication screen that is used for the user authentication. Furthermore, when the Web application is executed, the display control unit 161 allows the display 110 to display a screen in accordance with the process of the Web application.

When an operation of starting up the Web application is received by the input device 120, the authentication necessity determining unit 162 loads the specified Web application in the memory 150 and then determines whether the Web application needs user authentication. Specifically, because application setting information including various setting information, such as an icon image, is attached to each Web application, the authentication necessity determining unit 162 refers to the application setting information on the specified Web application and determines whether the user authentication is needed. If the user authentication is performed on all of the Web applications, the authentication necessity determining unit 162 may also determine that the user authentication is needed even if any one of the Web applications is selected.

If the authentication necessity determining unit 162 determines that the user authentication for the Web application is not needed, the authentication necessity determining unit 162 instructs the execution control unit 164 to execute the Web application. In contrast, if the authentication necessity determining unit 162 determines that the user authentication for the Web application is needed, the authentication necessity determining unit 162 loads the authentication application in the memory 150 and instructs the display control unit 161 and the user authentication unit 163 to execute the authentication application.

If authentication information, such as a password or the like, is received by the input device 120 when the authentication application is running, the user authentication unit 163 executes the user authentication by using the authentication information. Namely, the user authentication unit 163 determines whether the authentication information received by the input device 120 matches valid authentication information that is previously set in the authentication application. Then, the user authentication unit 163 notifies the execution control unit 164 of the result of the user authentication.

If the Web application loaded in the memory 150 is the Web application that does not need the user authentication, the execution control unit 164 executes the Web application in response to the notification received from the authentication necessity determining unit 162. Furthermore, if the Web application that is loaded in the memory 150 is the Web application that needs the user authentication, the execution control unit 164 checks the result of the user authentication that is received from the user authentication unit 163 as a notification. Then, if the result of the user authentication indicates successful, the execution control unit 164 executes the Web application that is loaded in the memory 150. In contrast, if the result of the user authentication indicates a fail, the execution control unit 164 unloads the Web application by deleting the Web application that has been loaded in the memory 150 from the memory 150.

In the following, an authentication application according to the first embodiment will be described. When a Web application is started up and needs user authentication, the authentication application is started up and executed. In this authentication application, valid authentication information that is targeted for the comparison with the authentication information that is input by a user when the user authentication is performed is set. The authentication application can be used, in common, for user authentication for multiple Web applications and is an application independent of each of the Web applications. Accordingly, the Web applications that are used offline can be protected even if the function for the user authentication is not added to each of the Web applications. Similarly to the Web applications, this type of authentication application may also be an application created by, for example, the HTML, the CSS, JavaScript™, or the like.

For example, a PIN code or a password may also be used for the authentication information or alternatively biometric information, such as a fingerprint or a vein pattern, may also be used. However, in light of the confidentiality of the Web application, it is preferable to use authentication information that can ensure the security that is more enhanced than, for example, the screen lock function of a smart phone. Namely, even if, for example, a PIN code is used as the authentication information, by setting the number of digits of a PIN code to, for example, six digits or more, a Web application can reliably be protected.

Figure 3:
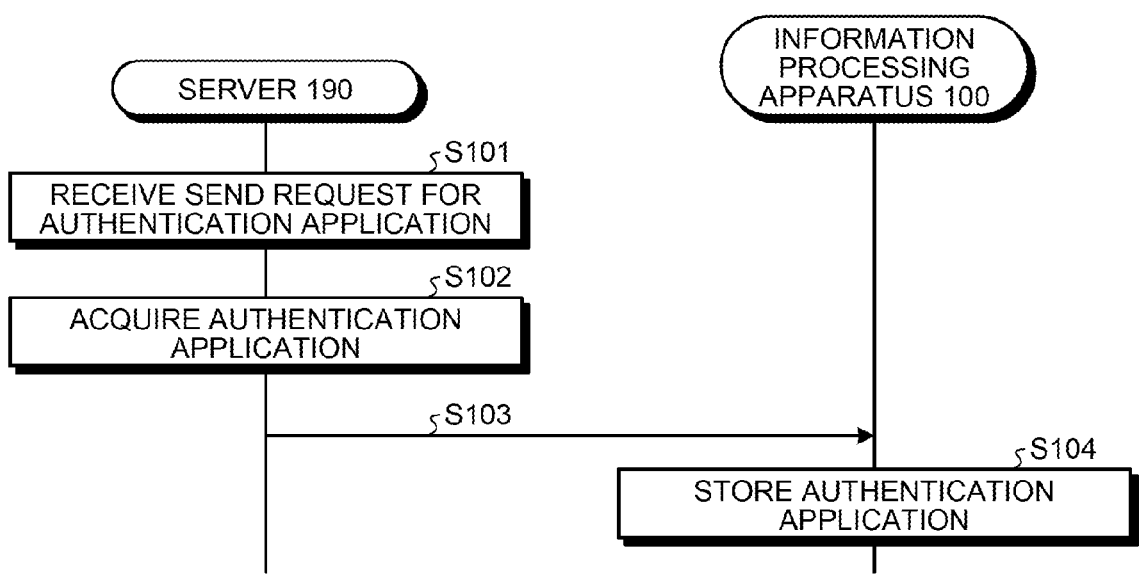
FIG. 3 is a sequence diagram illustrating an authentication application acquiring process according to the first embodiment.

An authentication application may previously be stored in a system area in the storage 140. Alternatively, an authentication application may also be downloaded from the server 190 and be stored in the storage 140. Furthermore, if valid authentication information that is set in an authentication application is changed by an information processing apparatus that is other than the information processing apparatus 100, the changed authentication application may also be automatically downloaded from the server 190 and acquired. FIG. 3 is a sequence diagram illustrating a process of acquiring an authentication application from the server 190.

As illustrated in FIG. 3, for example, when valid authentication information that is set in an authentication application is changed, a send request for the authentication application is received by the server 190 (Step S101). When the send request is received, the latest authentication application is acquired by the server 190 (Step S102). Then, the authentication application is sent to the information processing apparatus 100 (Step S103) and is received by the wireless I/F 130 via the access point 180. At this point, in order to prevent falsification of the authentication application, the authentication application is subjected to, for example, encryption, compilation, or obfuscation and is then sent from the server 190. Then, the received authentication application is stored in the system area in the storage 140 without processing anything after the encryption, compilation, or obfuscation (Step S104). At this point, the old authentication application is deleted from the storage 140 and the authentication application is maintained in the latest state. The authentication application may also be deleted from the storage 140 in accordance with an instruction from the server 190. In this way, because the encryption or obfuscated authentication application is stored in the system area in the storage 140, the authentication application is not able to be changed even by a user of the information processing apparatus 100 and thus the reliability of the authentication application can be enhanced.

Figure 4:
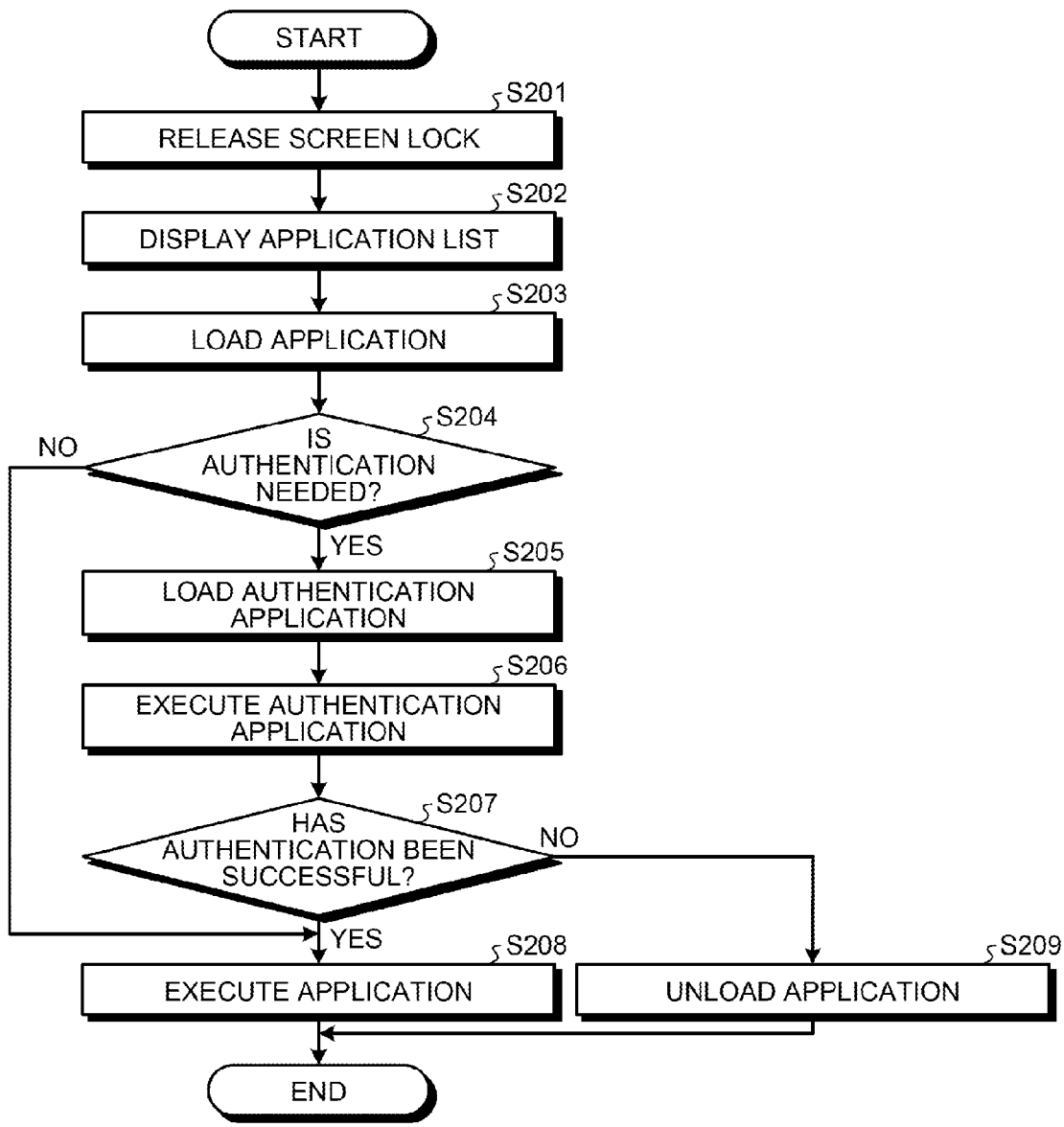
FIG. 4 is a flowchart illustrating the flow of a user authentication process according to the first embodiment.

In the following, a user authentication process according to the first embodiment will be specifically described with reference to FIG. 4. FIG. 4 is a flowchart illustrating the flow of a user authentication process according to the first embodiment. In the following, a description will be given of an example of a user authentication process that is performed when a Web application is used offline in a smart phone.

When a smart phone is used, first, a screen lock is released by a user (Step S201). Namely, if a power supply button or the like of the smart phone is pressed, for example, as illustrated by a screen 201 in FIG. 5, the screen for screen lock release is displayed on the display 110. At this example, on the screen for screen lock release, for example, an input of a 4-digit PIN code is requested. If the user inputs a previously set 4-digit PIN code, a screen of the list of the Web applications that can be executed is displayed on the display 110 (Step S202). Namely, for example, as illustrated by a screen 202 in FIG. 5, the application list screen in which icons of the Web applications are arrayed is displayed on the display 110. Furthermore, on the application list screen, an application other than the Web applications may also be displayed.

Figures 6, 7:
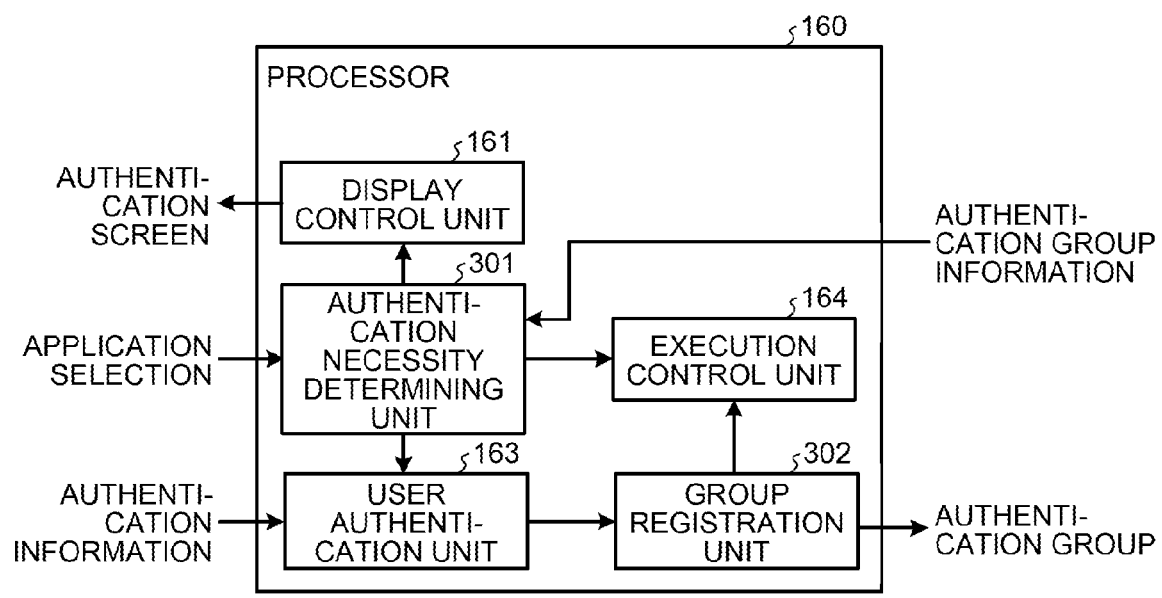
FIG. 6 is a schematic diagram illustrating a specific example of application setting information according to the first embodiment.
FIG. 7 is a block diagram illustrating the function performed by a processor according to a second embodiment.

Then, when the user selects one of the Web applications and an operation of starting up the Web application is received by the input device 120, the selected Web application is loaded in the memory 150 by the authentication necessity determining unit 162 (Step S203). When the Web application is loaded in the memory 150, the authentication necessity determining unit 162 determines whether the Web application needs user authentication (Step S204). Specifically, for example, application setting information 204 illustrated in FIG. 6 is referred to and the authentication necessity determining unit 162 determines whether user authentication related to the Web application is needed. In the example illustrated in FIG. 6, because a line 205 indicates that the user authentication is needed, the authentication necessity determining unit 162 determines that the Web application to which the application setting information 204 is attached needs the user authentication.

If the determination result performed by the authentication necessity determining unit 162 indicates that the user authentication is not needed (No at Step S204), the Web application that is loaded in the memory 150 is executed by the execution control unit 164 (Step S208). In contrast, if the authentication necessity determining unit 162 determines that the user authentication is needed, the authentication application is loaded in the memory 150 (Step S205) and the authentication application is executed by the display control unit 161 and the user authentication unit 163 (Step S206).

Figure 5:
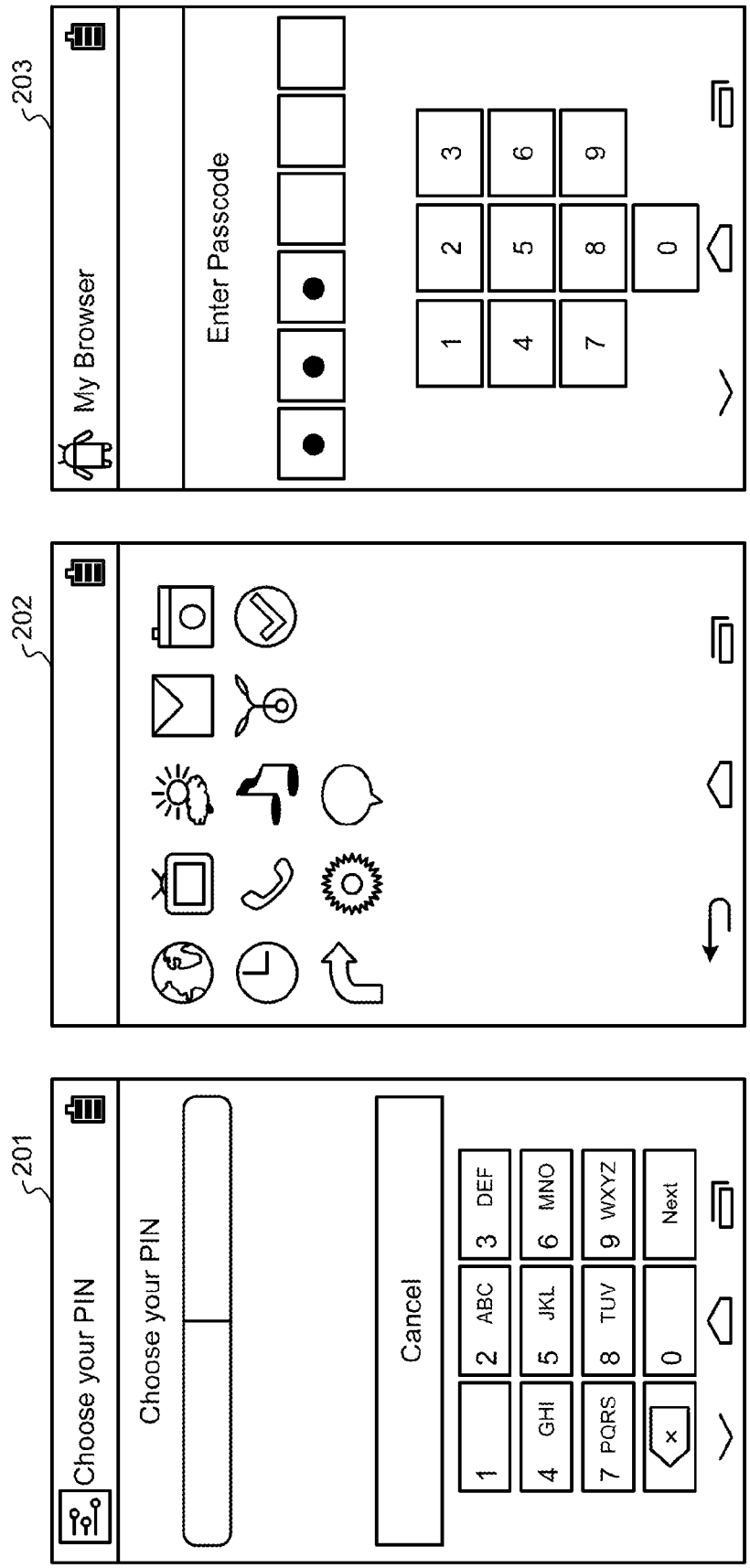
FIG. 5 is a schematic diagram illustrating examples of a screen of an information processing apparatus according to the first embodiment.

Specifically, under the control of the display control unit 161, for example, as illustrated by a screen 203 in FIG. 5, an authentication screen for a request for an input of authentication information is displayed on the display 110. In this example, on the authentication screen, for example, an input of a 6-digit passcode is requested. Namely, the passcode with the number of digits greater than that of the PIN code that was requested on the screen 201 is requested. Consequently, the security at the time of the startup of a Web application can be more enhanced than the security at the time of the release of a screen lock.

Then, if a passcode that is input by the user is received by the input device 120, the user authentication unit 163 compares the input passcode with the valid passcode that is previously set in the authentication application, thereby the user authentication is executed. At this point, if the input passcode matches the valid passcode, this means that the user authentication is successful, whereas if the input passcode does not match the valid passcode, this means that the user authentication failed.

The result of the user authentication is sent to the execution control unit 164 as a notification and it is determined whether user authentication has been successful (Step S207). After the determination, if the user authentication has been successful (Yes at Step S207), the Web application that has been loaded in the memory 150 is executed (Step S208). In contrast, if the user authentication failed (No at Step S207), the Web application that has been loaded in the memory 150 is unloaded by being deleted from the memory 150 (Step S209).

As described above, according to the first embodiment, when a Web application is started up, the information processing apparatus determines whether the Web application needs user authentication. If it is determined that the Web application needs the user authentication, the information processing apparatus executes the authentication application that is previously stored in the storage and executes the user authentication. Then, only when the user authentication is successful, the information processing apparatus executes the Web application. Consequently, even if the Web application itself does not have the function of the user authentication, the information processing apparatus can execute the user authentication for the user who uses the Web application without communication and can protect the application that is used offline.

Furthermore, in the first embodiment described above, the information processing apparatus may also be configured such that, after the user authentication of a Web application has been successful, the user authentication of the Web application is not needed for a predetermined time period. Namely, the information processing apparatus may also be configured such that, when the user authentication of a Web application has been successful, execution date and time of the user authentication is recorded, the authentication necessity determining unit 162 determines that the user authentication of the Web application is not needed until a predetermined time period has elapsed after the execution date and time. At this point, the configuration may also be set such that it is determined that user authentication is not needed only for the Web application in which the user authentication is successful or the configuration may also be set such it is determined that the user authentication is not needed for the Web application including the other Web application. With this configuration, if user authentication is successful only once, it is possible to eliminate the user authentication unlit a predetermined time period has elapsed, which makes it possible to enhance the convenience of the user.

Furthermore, in the first embodiment described above, when the information processing apparatus 100 is in an online state, the necessity of the user authentication may also be received from, for example, the server 190. In such a case, the processor 160 changes, in accordance with the instruction from the server 190, the user authentication that uses the authentication application to be executed or not.

[b] Second Embodiment

The characteristic of the second embodiment is that multiple Web applications are grouped and, after user authentication is successful when one of the Web applications is started up, user authentication is not needed when another Web application in the same group is started up.

The configuration of the communication system and the information processing apparatus 100 according to the second embodiment is the same as that in the first embodiment (FIG. 1); therefore, descriptions thereof will be omitted. The second embodiment differs from the first embodiment in the function performed by the processor 160.

FIG. 7 is a block diagram illustrating the function performed by the processor 160 according to a second embodiment. In FIG. 7, components that are the same as those in FIG. 2 are assigned the same reference numerals, and descriptions thereof will be omitted here. As illustrated in FIG. 7, the processor 160 includes the display control unit 161, an authentication necessity determining unit 301, the user authentication unit 163, the execution control unit 164, and a group registration unit 302.

When an operation of starting up the Web application is received by the input device 120, the authentication necessity determining unit 301 loads the specified Web application in the memory 150 and determines whether the Web application needs the user authentication. Specifically, because application setting information is attached to each of the Web applications, the authentication necessity determining unit 301 refers to the application setting information on the specified Web application and determines whether the user authentication is needed.

More specifically, the authentication necessity determining unit 301 determines whether, in the application setting information on the Web application, the Web application is set such that the user authentication is needed. If the Web application is set such that the user authentication is not needed, the authentication necessity determining unit 301 determines that the user authentication of the Web application that is loaded in the memory 150 is not needed. In contrast, if the setting is set such that the user authentication is needed, the authentication necessity determining unit 301 acquires, from the memory 150, authentication group information that is the information on the group to which the Web application in which the user authentication has been successful belongs.

Then, the authentication necessity determining unit 301 checks the group to which the Web application belongs from the application setting information on the Web application that has been loaded in the memory 150 and then determines whether the checked group is included in the authentication group information. If the determination result indicates that the group of the Web application is not included in the authentication group information, the authentication necessity determining unit 301 determines that the user authentication of the Web application that has been loaded in the memory 150 is needed. Furthermore, if the group of the Web application is included in the authentication group information, the authentication necessity determining unit 301 determines that the user authentication of the Web application that has been loaded in the memory 150 is not needed.

If the authentication necessity determining unit 301 determines that the user authentication of the Web application is not needed, the authentication necessity determining unit 301 instructs the execution control unit 164 to execute the Web application. In contrast, if the authentication necessity determining unit 301 determines that the user authentication of the Web application is needed, the authentication necessity determining unit 301 loads the authentication application in the memory 150 and instructs the display control unit 161 and the user authentication unit 163 to execute the authentication application.

The group registration unit 302 checks the result of the user authentication that is notified by the user authentication unit 163. If the result of the user authentication indicates successful, the group registration unit 302 additionally registers, in the authentication group information, the group to which the Web application that is loaded in the memory 150 belongs. Namely, the group registration unit 302 causes the memory 150 to store, as the authentication group information, the identification information on the group to which the Web application in which the user authentication has been successful belongs.

Figures 8, 9:
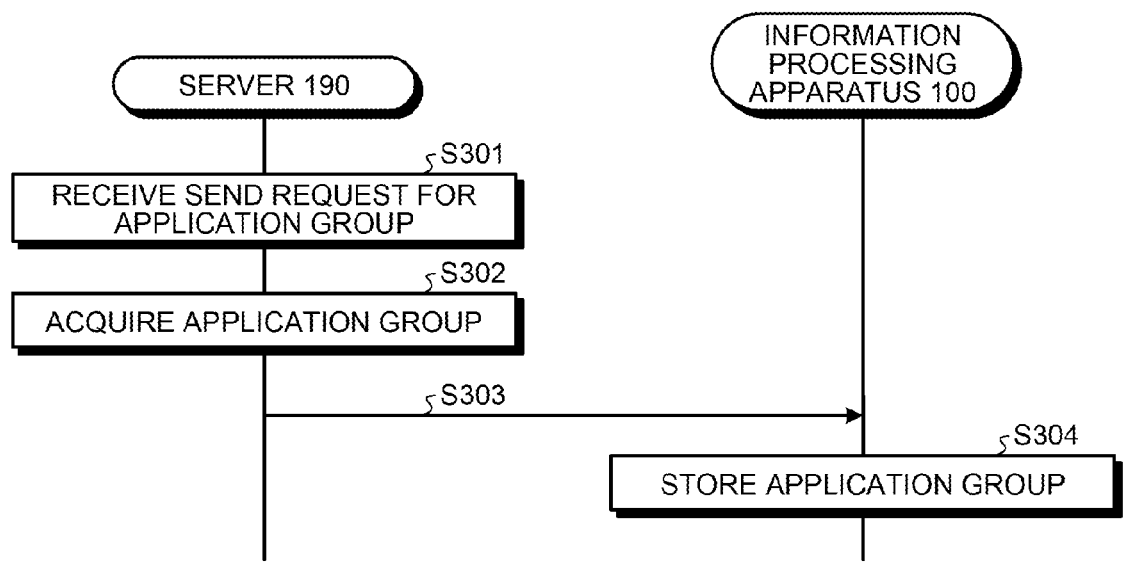
FIG. 8 is a sequence diagram illustrating an application group acquiring process according to the second embodiment.
FIG. 9 is a schematic diagram illustrating a specific example of application setting information according to the second embodiment.

In the following, a description will be given of a Web application group (hereinafter, referred to as an "application group") according to the second embodiment. An application group is formed from multiple Web applications. The Web applications belonging to the application group may also be multiple Web applications that are used for, for example, a single piece of business or may also be multiple Web applications that operate in cooperation with each other. Furthermore, the Web applications belonging to each application group may also be downloaded from the server 190 at a time. FIG. 8 is a sequence diagram illustrating a process of acquiring an application group from the server 190.

As illustrated in FIG. 8, for example, when a request for distribution of an application group that is used for predetermined business is received from an external scheduler, a send request for the application group is received by the server 190 (Step S301). When the send request is received, multiple Web applications belonging to an application group is acquired by the server 190 (Step S302). Then, the application group is sent to the information processing apparatus 100 (Step S303) and is then received by the wireless I/F 130 via the access point 180. Then, the received application group is stored in the storage 140 (Step S304). Furthermore, instead of the request from the external scheduler, the application group may also, of course, be sent from the server 190 in accordance with a request from the information processing apparatus 100.

In addition to the setting indicating whether user authentication is needed, identification information on an application group is included in the application setting information on each of the Web applications belonging to the application group. Specifically, for example, application setting information 351 illustrated in FIG. 9 is attached to the Web applications and an application group to which each of the Web applications belongs is specified. In FIG. 9, a line 352 specifies the application group of one of the Web applications and the Web application belongs to the application group in which the identification information is "group1". Accordingly, the application setting information that includes the same line as that indicated by the line 352 is attached to the other Web applications belonging to the application group in which the identification information is "group1".

Figure 10:
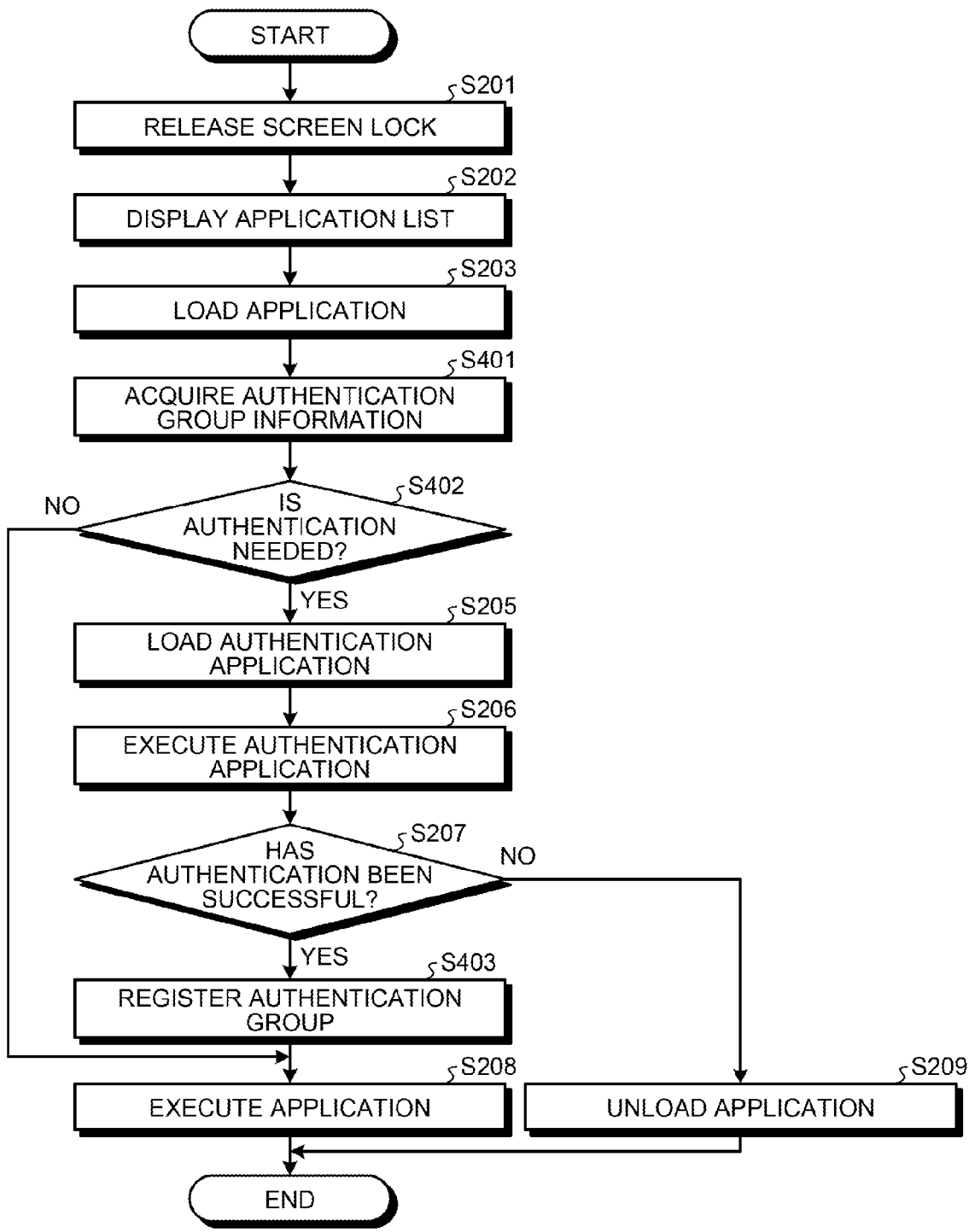
FIG. 10 is a flowchart illustrating the flow of a user authentication process according to the second embodiment.

In the following, a user authentication process according to the second embodiment will be described with reference to FIG. 10. In FIG. 10, components that are the same as those in FIG. 4 are assigned the same reference numerals, and descriptions thereof in detail will be omitted here. In the following, a description will be given of an example of a user authentication process that is performed when a Web application is used offline in a smart phone.

When a smart phone is used, first, a screen lock is released by a user (Step S201) and the list screen of Web applications that can be executed is displayed on the display 110 (Step S202). Furthermore, on the screen of the list of applications, an application other than the Web applications may also be displayed.

Then, when the user selects one of the Web applications and an operation of starting up the Web application is received by the input device 120, the selected Web application is loaded in the memory 150 by the authentication necessity determining unit 301 (Step S203). When the Web application is loaded in the memory 150, the authentication group information that indicates the application group in which the user authentication has already been successful is acquired from the memory 150 by the authentication necessity determining unit 301 (Step S401). Then, by using the application setting information and the authentication group information on the Web application that is loaded in the memory 150, the authentication necessity determining unit 301 determines whether the Web application needs the user authentication (Step S402).

Specifically, for example, the application setting information 351 illustrated in FIG. 9 is referred to and it is determined whether the user authentication related to the Web application is needed. If the setting indicates that the user authentication is not needed, it is determined that the user authentication is not needed for the Web application to which the application setting information 351 is attached. In contrast, if the setting indicates that the user authentication is needed, the line 352 in the application setting information 351 is further referred to and the identification information on the application group to which the Web application belongs is acquired. If the acquired identification information is included in the authentication group information, because the Web application to which the application setting information 351 is attached belongs to the application group in which the user authentication has already been successful, it is determined that the user authentication is not needed. In contrast, if the acquired identification information is not included in the authentication group information, it is determined that the user authentication is needed for the Web application to which the application setting information 351 is attached.

If the result of the determination performed by the authentication necessity determining unit 301 indicates that the user authentication is not needed (No at Step S402), the Web application that has been loaded in the memory 150 is executed by the execution control unit 164 (Step S208). In contrast, if it is determined that the user authentication is needed (Yes at Step S402), the authentication application is loaded in the memory 150 (Step S205) and the authentication application is executed by the display control unit 161 and the user authentication unit 163 (Step S206).

The result of the user authentication performed by using the authentication application is sent to the group registration unit 302 as a notification and then it is determined whether the user authentication has been successful (Step S207). If the result of the determination indicates that the user authentication has been successful (Yes at Step S207), the group registration unit 302 additionally registers, in the authentication group information, the identification information on the application group to which the Web application in which the user authentication has been successful belongs (Step S403). Namely, because the user authentication of the Web application has been successful, the identification information on the application group to which the Web application belongs is registered in the authentication group information. Consequently, if the user authentication for a Web application is successful once, the user authentication for a Web application belonging to the same application group is not needed after that and thus the convenience of a user can be enhanced.

Then, if the user authentication is successful, after the identification information on the application group is registered in the authentication group information, the Web application that is loaded in the memory 150 is executed by the execution control unit 164 (Step S208). In contrast, if the user authentication failed (No at Step S207), the identification information on the application group is not registered in the authentication group information, and the Web application that is loaded in the memory 150 is unloaded by the execution control unit 164 (Step S209).

As described above, according to the second embodiment, when a Web application is started up, the information processing apparatus acquires the information on the application group in which user authentication has already been successful and determines that the user authentication to be performed when a Web application is started up is not needed for the Web application that belongs this application group. Consequently, for the Web applications that belong to the same application group, if the user authentication is successful once, there is no need to perform the user authentication after that and thus the convenience of a user can be enhanced.

Furthermore, in the second embodiment described above, the identification information on an application group may also be registered in the authentication group information on a temporary basis. Namely, if the user authentication for the Web application is successful and if the identification information on an application group is registered in the authentication group information, the registration date and time is stored. If a predetermined time has elapsed after the registration date and time, the identification information on the application group may also be deleted from the authentication group information. By doing so, even if the Web application belongs to the application group in which the user authentication has been successful, it is determined that the user authentication is needed for every predetermined time period, which makes it possible to further reliably protect Web applications belonging to each application group.

Furthermore, in the second embodiment described above, in accordance with an application group being deleted from the storage 140, the identification information on the application group may also be deleted from the authentication group information. By doing so, it is possible to prevent unwanted identification information from continuously being registered in the authentication group information.

[c] Third Embodiment

The characteristic of the third embodiment is that, when user authentication for a Web application is needed, the user authentication with the type that is specified, by a Web application, from among multiple types of user authentication is executed.

The configuration of the communication system and the information processing apparatus 100 according to the third embodiment is the same as that in the first embodiment (FIG. 1); therefore, descriptions thereof will be omitted. The third embodiment differs from the first embodiment in the function of the processor 160.

Figures 11, 12:
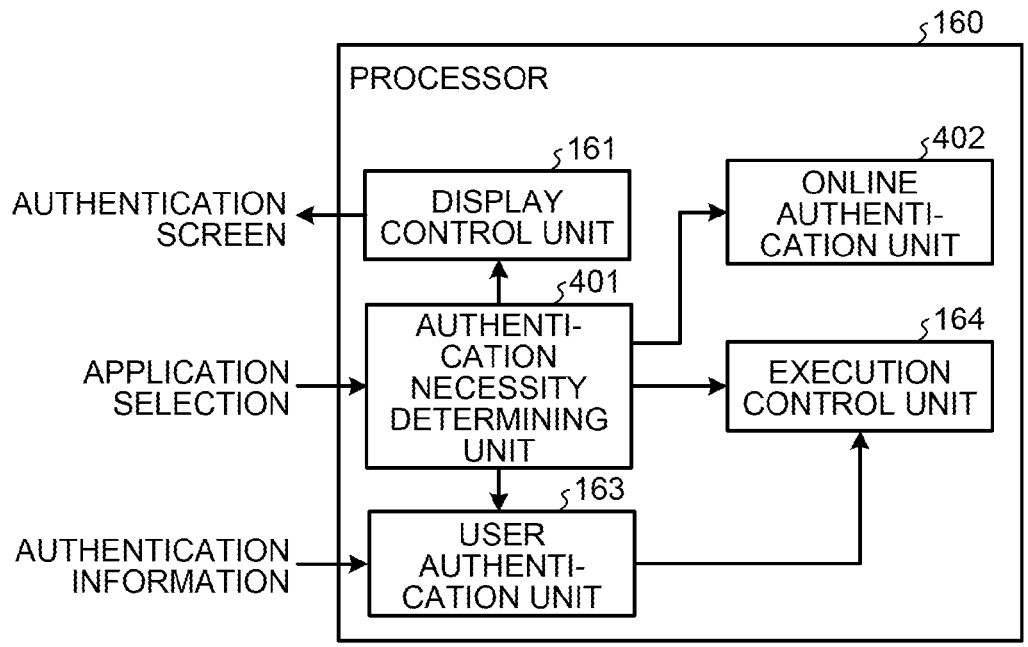
FIG. 11 is a block diagram illustrating the function performed by a processor according to a third embodiment.
FIG. 12 is a schematic diagram illustrating a specific example of application setting information according to the third embodiment.

FIG. 11 is a block diagram illustrating the function performed by the processor 160 according to a third embodiment. In FIG. 11, components that are the same as those in FIG. 2 are assigned the same reference numerals, and descriptions thereof will be omitted here. As illustrated in FIG. 11, the processor 160 includes the display control unit 161, an authentication necessity determining unit 401, the user authentication unit 163, the execution control unit 164, and an online authentication unit 402.

When an operation to starting up a Web application is received by the input device 120, the authentication necessity determining unit 401 loads the specified Web application in the memory 150 and then determines whether user authentication is needed for the Web application. Specifically, because the application setting information is attached to each of the Web applications, the authentication necessity determining unit 401 refers to the application setting information on the specified Web application and determines whether the user authentication is needed.

More specifically, the authentication necessity determining unit 401 determines whether the setting of the Web application indicates that the user authentication is needed in the application setting information on the Web application. If the setting indicates the user authentication is not needed, the authentication necessity determining unit 401 determines that the user authentication for the Web application that is loaded in the memory 150 is not needed. In contrast, if the setting indicates that the user authentication is needed, the authentication necessity determining unit 401 acquires the type of the user authentication from the application setting information.

Namely, for example, the authentication necessity determining unit 401 refers to a line 452 in application setting information 451 illustrated in FIG. 12 and determines which authentication application from among multiple authentication applications is used for the user authentication. An example of the multiple authentication applications includes, for example, multiple types of authentication applications, such as an authentication application for executing online authentication that is performed online, an authentication application for executing offline authentication that is performed only offline. Furthermore, for the authentication application for executing the online authentication, for example, multiple authentication applications with different connections may also be used. For the authentication application for executing the offline authentication, for example, multiple authentication applications in each of which a different authentication method is used. Furthermore, an authentication application for executing both the online authentication and the offline authentication may also be used. On the line 452 illustrated in FIG. 12, because the value of "1" is stored in the parameter named "gpattern", the authentication necessity determining unit 401 determines that the user authentication that is executed by the authentication application associated with this parameter is needed.

If the authentication necessity determining unit 401 determines that the user authentication for the Web application is not needed, the authentication necessity determining unit 401 instructs the execution control unit 164 to execute the Web application. In contrast, if the authentication necessity determining unit 401 determines that the user authentication for the Web application is needed, the authentication necessity determining unit 401 loads the authentication application that is specified by the application setting information in the memory 150 and then instructs the other processing unit to execute the authentication application. Namely, if an authentication application for executing the online authentication is specified, the authentication necessity determining unit 401 instructs the online authentication unit 402 to execute the authentication application. Furthermore, if an authentication application for executing the offline authentication is specified, the authentication necessity determining unit 401 instructs the display control unit 161 and the user authentication unit 163 to execute the authentication application.

If the online authentication unit 402 receives, from the authentication necessity determining unit 401, the instruction to execute an authentication application, the online authentication unit 402 acquires, from the specified authentication application, connection destination information for the user authentication, connects to the connection destination that is indicated by the connection destination information, and executes the online authentication. Then, the online authentication unit 402 notifies the execution control unit 164 of the result of the online authentication.

Figure 13:
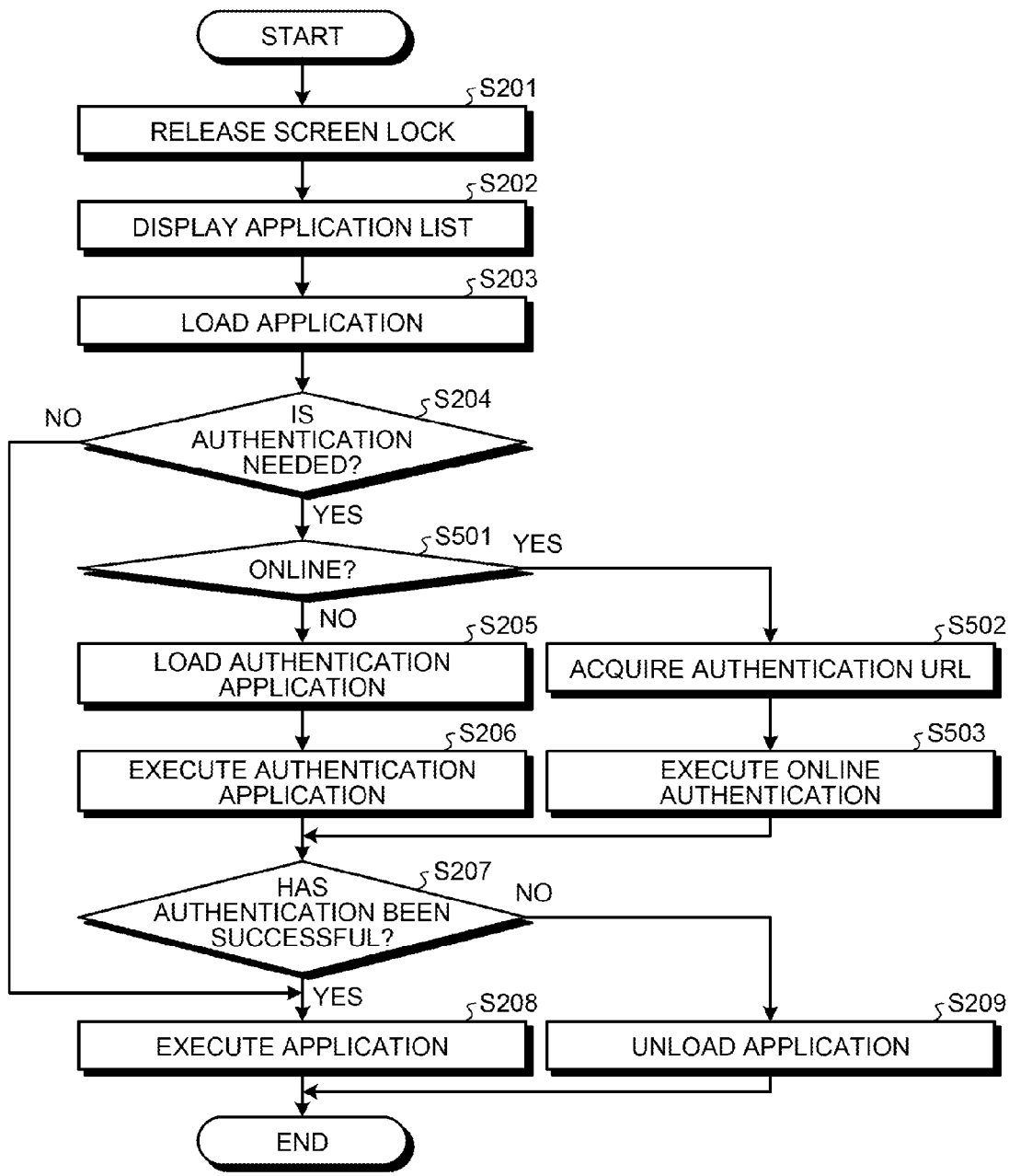
FIG. 13 is a flowchart illustrating the flow of a user authentication process according to the third embodiment.

In the following, a user authentication process according to the third embodiment will be described with reference to FIG. 13. In FIG. 13, components that are the same as those in FIG. 4 are assigned the same reference numerals, and descriptions thereof in detail will be omitted here. In the following, a description will be given of an example of a user authentication process performed when a Web application is used in a smart phone.

When a smart phone is used, first, a screen lock is released by a user (Step S201) and the screen of the list of Web applications that can be executed is displayed on the display 110 (Step S202). Furthermore, on the screen of the list of the Web applications, an application other than the Web applications may also be displayed.

Then, when the user selects one of the Web applications and an operation of starting up the Web application is received by the input device 120, the selected Web application is loaded in the memory 150 by the authentication necessity determining unit 401 (Step S203). When the Web application is loaded in the memory 150, the authentication necessity determining unit 401 refers to the application setting information on the Web application and determines whether the user authentication is needed (Step S204). If the determination result indicates that the user authentication is not needed (No at Step S204), the execution control unit 164 executes the Web application that is loaded in the memory 150 (Step S208).

In contrast, if the authentication necessity determining unit 401 determines that the user authentication is needed (Yes at Step S204), the authentication necessity determining unit 401 further refers to the application setting information and specifies the authentication application that is used for the user authentication. In this way, because the authentication application that is used for the user authentication is specified from the application setting information, different types of user authentications can be executed for each Web application and thus a Web application can be protected by an appropriate method in accordance with the confidentiality of the Web application.

When the authentication application is specified from the application setting information, the authentication necessity determining unit 401 determines whether the specified authentication application executes the online authentication (Step S501). If the result of the determination indicates that the online authentication needs to be executed (Yes at Step S501), the online authentication unit 402 acquires, from the authentication application, a uniform resource locator (URL) of the connection destination that is used for the authentication (Step S502). Then, the online authentication unit 402 connects to the URL of the connection destination and then executes the online authentication (Step S503).

In the online authentication, for example, user authentication executed by using a password or the like is performed. Unlike the offline authentication, in the online authentication, an execution log for the user authentication can be recorded in the connection destination. Furthermore, for example, if a use in a Web application needs to be temporarily stopped, in the online authentication, the user authentication can also be stopped. After the result of the online authentication, the online authentication unit 402 notifies the execution control unit 164 whether the user authentication has been successful.

Furthermore, if the authentication application specified by the application setting information is an application that executes the offline authentication (No at Step S501), the authentication application is loaded in the memory 150 (Step S205) and is executed by the display control unit 161 and the user authentication unit 163 (Step S206). A notification indicating whether, as the result of the authentication application being executed, the user authentication has been successful is sent from the user authentication unit 163 to the execution control unit 164.

Then, the execution control unit 164 determines whether the user authentication has been successful (Step S207). If the user authentication has been successful (Yes at Step S207), the Web application that is loaded in the memory 150 is executed (Step S208). In contrast, if the user authentication failed (No at Step S207), the Web application that is loaded in the memory 150 is unloaded from the memory 150 (Step S209).

As described above, according to the third embodiment, when a Web application is started up, an information processing apparatus executes the online authentication or the offline authentication in accordance with the authentication application that is specified by the application setting information. Consequently, it is possible to execute, for each Web application, different types of user authentications and thus a Web application can be protected by an appropriate method in accordance with the confidentiality of the Web application.

Furthermore, in the third embodiment described above, authentication applications with different types of user authentication may also be executed depending on whether the information processing apparatus 100 is online or offline. Namely, the authentication necessity determining unit 401 checks whether the wireless I/F 130 is connected to the access point 180. If the connection is made, the online authentication is executed, whereas, if the connection is not made, the offline authentication may also be executed.

In such a case, depending on whether the online authentication is executed or the offline authentication is executed, the necessity of a subsequent user authentication may also differ. Namely, if online authentication has been successful when a Web application is started up, the determination may also be set such that the user authentication is not needed at the subsequent startup of the other Web application and, if offline authentication has been successful, the determination may also be set such that the user authentication is needed at the subsequent startup of the other Web application. Furthermore, if the offline authentication for a Web application has been successful, the determination may also be additionally set such that the user authentication is not needed at the startup of the other Web application until a predetermined time period has elapsed but the user authentication is needed at the startup of the other Web application after the predetermined time period has elapsed. Furthermore, some functions of the Web application may also be limited such that, for example, if the offline authentication of the Web application has been successful, important information is not able to be displayed.

In each of the embodiments described above, an authentication application is executed as needed when a Web application created by, for example, the HTML, CSS, or JavaScript™, is started up. However, the user authentication executed by the authentication application may also be used for an application other than the Web application.

Each of the embodiments may also be used in any combination. Namely, for example, by combining the second embodiment and the third embodiment, user authentication for each application group can be implemented by the online authentication or the offline authentication.

Furthermore, in each of the embodiments, user authentication executed by an authentication application is associated with user authentication executed by the other service and, if the user authentication executed by the authentication application has been successful, the user authentication executed by the other service may also be automatically executed. Specifically, for example, the authentication application manages authentication information used for the user authentication in another service and, if the user authentication that uses the authentication application is successful, the user authentication that uses the authentication information on the other service is executed. Namely, for example, as illustrated in FIG. 14, the authentication application manages an authentication information table that stores therein authentication information, such as a login name and a password for each service, the authentication information is used for user authentication for each service. Accordingly, for example, in the example illustrated in FIG. 14, if the user authentication executed by the authentication application is successful, the authentication information on a service A and a service B is automatically input and the online authentication related to these services is executed.

Furthermore, the user authentication process performed by the information processing apparatus 100 described in each of the embodiments may also be described as a user authentication program that can be executed by a computer. In such a case, the user authentication program may also be stored in a computer readable recording medium and installed in the computer. Examples of the computer readable recording medium includes a portable recording medium, such as a CD-ROM, a DVD disk, a USB memory, and the like or a semiconductor memory, such as a flash memory and the like.

According to an aspect of an embodiment of the information processing apparatus and the user authentication method disclosed in the present invention, an advantage is provided in that an application that is used offline can be protected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor that is connected to the memory, wherein the processor executes a process comprising:
determining, when startup of an application is instructed, whether the application needs user authentication;
executing, when it is determined that the application does not need the user authentication, the application without executing the user authentication;
executing, when it is determined that the application needs the user authentication, the user authentication by starting up an authentication application that is different from the application; and
executing, when the result of the user authentication indicates that the user authentication is successful, the application that is instructed to start up, wherein
the executing the user authentication includes executing user authentication online by starting up an authentication application that specifies a connection destination for the user authentication and connecting to the specified connection destination, determining whether the information processing apparatus is in an online state or in an offline state, and executing, when the information processing apparatus is in the online state, the user authentication online by connecting to the connection destination, whereas executing, when the information processing apparatus is in the offline state, the user authentication offline, and
the determining includes determining, when the user authentication that is related to the application and that is performed offline is successful, that the user authentication for the application is needed again after a predetermined time elapses.

2. The information processing apparatus according to claim 1, wherein the determining includes determining, when the user authentication related to the application is successful, that the application does not need user authentication until a predetermined time period elapses.

3. The information processing apparatus according to claim 1, wherein the memory stores, when the user authentication is successful, identification information on a group to which the application belongs, and
the process further comprises
determining, when startup of another application is instructed, whether identification information on a group to which the other application belongs is stored in the memory and determining, when the identification information is stored in the memory, that the other application does not need the user authentication.

4. The information processing apparatus according to claim 1, wherein the executing the user authentication includes executing the user authentication by starting up an authentication application specified by the application from among a plurality of authentication applications.

5. The information processing apparatus according to claim 1, wherein the executing the application includes executing, depending on whether the user authentication is executed online or offline, the application with different limitation.

6. The information processing apparatus according to claim 1, wherein the memory stores authentication information that is used to use a service provided by another device that is different from the information processing apparatus, and
the process further comprises
sending, when the result of the user authentication indicates that the user authentication is successful, the authentication information stored in the memory to the other device.

7. The information processing apparatus according to claim 1, further comprising a receiver that receives the authentication application, wherein
the process further comprises
storing, in a storing unit, the authentication application received by the receiver.

8. The information processing apparatus according to claim 7, wherein
the receiver receives an authentication application subjected to encryption, compilation, or obfuscation, and
the storing includes storing the authentication application subjected to encryption, compilation, or obfuscation in the storing unit.

9. The information processing apparatus according to claim 7, wherein the process further comprises
deleting, when an instruction to delete the authentication application is received from a send source of the authentication application, the authentication application stored in the storing unit.

10. The information processing apparatus according to claim 7, wherein the process further comprises
switching, in accordance with an instruction from a send source of the authentication application, the user authentication that uses the authentication application to be executed or not.

11. A user authentication method comprising:
determining, when startup of an application is instructed, whether the application needs user authentication, using a processor;
executing, when it is determined that the application does not need the user authentication, the application without executing the user authentication, using the processor;
executing, when it is determined that the application needs the user authentication, the user authentication by starting up an authentication application that is different from the application, using the processor; and
executing, when the result of the user authentication indicates that the user authentication is successful, the application that is instructed to start up, using the processor, wherein
the executing the user authentication includes executing user authentication online by starting up an authentication application that specifies a connection destination for the user authentication and connecting to the specified connection destination, determining whether the information processing apparatus is in an online state or in an offline state, and executing, when the information processing apparatus is in the online state, the user authentication online by connecting to the connection destination, whereas executing, when the information processing apparatus is in the offline state, the user authentication offline, and
the determining includes determining, when the user authentication that is related to the application and that is performed offline is successful, that the user authentication for the application is needed again after a predetermined time elapses.

12. An information processing apparatus comprising:
a memory; and
a processor that is connected to the memory, wherein the processor executes a process comprising:
determining, when startup of an application is instructed, whether the application needs user authentication;
executing, when it is determined that the application does not need the user authentication, the application without executing the user authentication;
executing, when it is determined that the application needs the user authentication, the user authentication by starting up an authentication application that is different from the application; and
executing, when the result of the user authentication indicates that the user authentication is successful, the application that is instructed to start up, wherein
the executing the user authentication includes executing user authentication online by starting up an authentication application that specifies a connection destination for the user authentication and connecting to the specified connection destination, determining whether the information processing apparatus is in an online state or in an offline state, and executing, when the information processing apparatus is in the online state, the user authentication online by connecting to the connection destination, whereas executing, when the information processing apparatus is in the offline state, the user authentication offline, and
the executing the application includes executing, depending on whether the user authentication is executed online or offline, the application with different limitation.

13. A user authentication method comprising:
determining, when startup of an application is instructed, whether the application needs user authentication, using a processor;
executing, when it is determined that the application does not need the user authentication, the application without executing the user authentication, using the processor;
executing, when it is determined that the application needs the user authentication, the user authentication by starting up an authentication application that is different from the application, using the processor; and
executing, when the result of the user authentication indicates that the user authentication is successful, the application that is instructed to start up, using the processor, wherein
the executing the user authentication includes executing user authentication online by starting up an authentication application that specifies a connection destination for the user authentication and connecting to the specified connection destination, determining whether the information processing apparatus is in an online state or in an offline state, and executing, when the information processing apparatus is in the online state, the user authentication online by connecting to the connection destination, whereas executing, when the information processing apparatus is in the offline state, the user authentication offline, and the executing the application includes executing, depending on whether the user authentication is executed online or offline, the application with different limitation.

* * * * *